L. E. HALE.
THERMO ELECTRIC BATTERY FOR MOTOR VEHICLES.
APPLICATION FILED NOV. 20, 1913.
1,134,452. Patented Apr. 6, 1915.
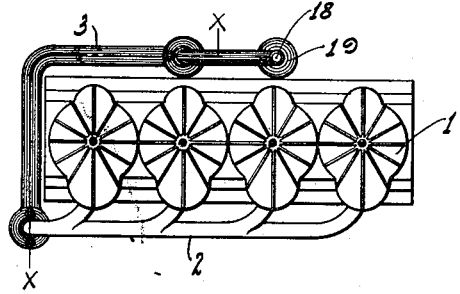
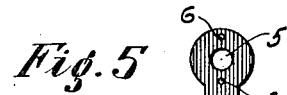
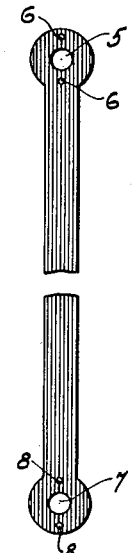
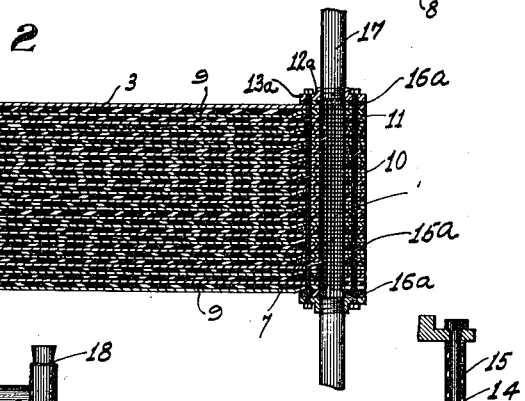
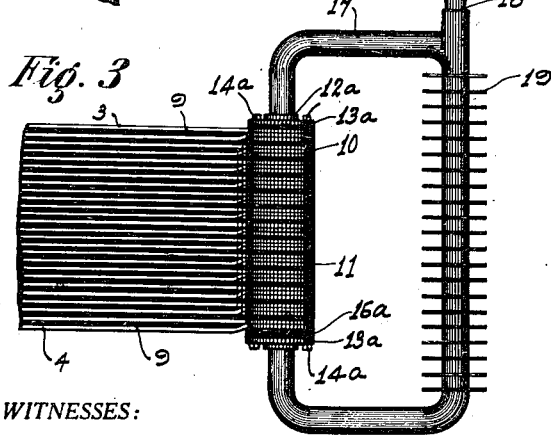
WITNESSES:
Clarence M. Smith
J. B. Webster
INVENTOR.
L. E. Hale
BY
ATTORNEYS.

UNITED STATES PATENT OFFICE.

LEIGH E. HALE, OF STOCKTON, CALIFORNIA, ASSIGNOR OF ONE-HALF TO FLOYD C. BOLIN, OF STOCKTON, CALIFORNIA.

THERMO-ELECTRIC BATTERY FOR MOTOR-VEHICLES.

1,134,452.  Specification of Letters Patent.  Patented Apr. 6, 1915.

Application filed November 20, 1913. Serial No. 802,068.

*To all whom it may concern:*

Be it known that I, LEIGH E. HALE, a citizen of the United States, residing at Stockton, in the county of San Joaquin, State of California, have invented certain new and useful Improvements in Thermo-Electric Batteries for Motor-Vehicles; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in attachments for motor vehicles and is particularly designed as a thermo electric battery to be attached to the motor vehicles for the purpose of generating electrical energy to be used for lighting, ignition or for any other desired purpose, but more especially for the purpose of lighting motor cycles which are of such construction as to render it undesirable to use a storage battery thereon with the necessary generating equipment.

The object of my invention is to produce a thermopile adapted to be connected with the exhaust pipe of a motor in such a manner that the heat passing from said exhaust pipe will operate the thermopile to generate the electricity for the purposes set forth. By means of this structure the entire power delivered by the engine can be applied to drive the vehicle, none of it being applied to generate the electricity as is the case when such electricity is generated by the magneto or a dynamo.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a top plan view of a motor showing my improved structure connected therewith. While this motor shown is of the type known as a four cylinder motor, still of course the device can be used equally well on a two cylinder motor of the V-type commonly used on motor cycles. Fig. 2 is a sectional view taken on a line X—X of Fig. 1, but showing the same in extended position instead of bent. Fig. 3 is a fragmentary view of one end of the thermopile showing a cooler attached thereto. Fig. 4 is a sectional view of a connecting bolt and insulating sleeve adapted to bind the thermopile together into one solid mass or body. Fig. 5 is a top plan view of one of the elements used in the thermopile. Fig. 6 is a top plan view of one of the insulating members used in the thermopile.

Referring now more particularly to the characters of reference on the drawings, the numeral 1 designates the motor and the numeral 2 the exhaust pipe thereof. In constructing and installing my improved thermopile, the same consists of a plurality of positive elements 4 which are similar to the elements 3 in structure. These elements 3 will be the positive elements, probably copper or an alloy of copper, and the elements 4 will be the negative conducting elements, probably nickel or some other metal or alloy which is negative to the element 3. At one end, each of the elements 3 and 4 will be provided with an orifice 5 of substantially the same diameter as the pipe 2 and on each side of said orifice 5 will be provided with orifices 6 for the purpose of receiving bolts as will presently appear. At the other end, each of the members 3 and 4 is provided with another orifice 7 of any suitable size, all of such orifices 7 being adapted to form in the aggregate a hole to communicate with a cooling member as will also presently appear. On each side of the orifice 7 are orifices 8 to receive bolts in a manner similar to the orifice 6.

In forming the thermopile, the members 3 and 4 are laid in alternate order. They are formed to engage each other at the ends in alternate relation as at 10, there being suitable insulators such as mica plates or strips 9 laid between them for the balance of their length. For an example of this structure, the numeral 10 designates the connecting ends and at each of the connecting ends I provide an inserted washer 11 of suitable metal such as copper in order to compensate for the offset occasioned by one of the members 3 and 4 bending upwardly at one end to engage its corresponding member, all as shown clearly in Figs. 2 and 3. The members 9 are provided at one end with orifices 5ª and 6ª to correspond with the orifices 5 and 6 when placed one way between one pair of the members 3 and 4 to correspond with the orifices 7 and 8 when placed the other way between the next pair of members 4 and 3 and so on. The thermopile when constructed will consist of a member 3, a member 9, a member 4 and another member 9 with one end of the members 3 and 4 engaged and a washer 11 between the engaged end of the member 4 and the last named member 9 and then this structure is repeated indefinitely to form any size of thermopile. All of the orifices 5 and 5ª, and the orifices in the washer 11 on that side are alined to form a continuous hole of the same diameter as the pipe 2. The said pipe 2 is then connected at each end of this hole by means of a threaded collar 12 which is screw mounted on the ends of the pipe 2 on each side of the thermopile and provided with flanges 13, there being bolts 14 which then project through the flanges 13 and the holes 6 and 6ª to bind all of the elements together and connect them with the ends of the pipe 2 whereby the hole formed through the thermopile will be a part of the exhaust pipe from the motor 1. The bolts 14 are of course suitably insulated by means of insulation sleeves 15 and the collars 12—13 are suitably insulated from the thermopile by means of insulating washers 16. On the other end of the thermopile, the orifices 7—5ª are all alined to form a continuous hole and the thermopile is then at this end connected with a water cooler 17 by means of collars 12ª, similar to the collars 12, provided with flanges 13ª, similar to the flanges 13, which said washers 12ª are screw mounted on the ends of the pipe 17, the said thermopile at that end being bound together and connected with the flanges 13ª by means of bolts 14ª similar to the bolts 14, the said bolts 14ª being insulated from the thermopile by insulating sleeves 15ª and the washers 12ª—13ª being insulated from the thermopile by washers 16ª. Thus, as will be seen, the orifices 7 and 5ª form a part of the pipe 17 when the thermopile is connected in position and this pipe 17 may be provided with an opening 18 in order to pour water therein if desired and also with projecting cooling flanges 19, the principle of the cooler being of that type known as the thermosyphon. In practice, the heat passing through the pipe 2 passes also through the hole formed by the orifices 5 and 5ª and the heat from the exhaust gases so passing through the hole in the thermopile gradually being conducted toward the outer or cooled end of the thermopile forms a current of electricity which is then transmitted through wires 20 for lighting purposes or any other similar use to which electrical energy can be put.

From the foregoing description it will readily be seen that I have produced such a device as substantially fulfills the objects of the invention as set forth herein.

While this specification sets forth in detail the present and preferred construction of the device, still in practice, such deviations from such detail may be resorted to as do not form a departure from the spirit of the invention as defined by the appended claims.

Having thus described my invention what I claim as new and useful and desire to secure by Letters Patent is:

A thermo electric battery comprising elements arranged in couples, each couple being composed of metals differing in the thermo electric order, the terminal of one element being offset and in face contact with the adjacent element, such offset portion forming an intermediate space between such elements, a sheet of insulation interposed in such space, a sheet of insulation applied to the outer face of said element having such offset portion forming a recess between such last named sheet of insulation and such offset portion, a washer interposed in such recess, all of said elements being secured together and provided with a continuous passageway through their ends, as described.

In testimony whereof I affix my signature in presence of two witnesses.

LEIGH E. HALE.

Witnesses:
STEPHEN N. BLEWETT,
CLARENCE M. SMITH.